United States Patent

[11] 3,594,020

[72] Inventor William E. Ehlert
 Bellwood, Ill.
[21] Appl. No. 818,861
[22] Filed Apr. 24, 1969
[45] Patented July 20, 1971
[73] Assignee Stanadyne, Inc.
 Bellwood, Ill.

[54] FASTENING MEANS FOR CRANKCASE VENT VALVE
 5 Claims, 3 Drawing Figs.
[52] U.S. Cl. .................................................. 285/239,
 285/174, 29/521, 123/119
[51] Int. Cl. ................................................... F16l 33/00
[50] Field of Search ........................................... 285/239,
 256; 137/480, 517; 123/119 B; 29/521

[56] References Cited
 UNITED STATES PATENTS
| 1,994,784 | 3/1935 | Porzel | 285/239 |
| 2,139,745 | 12/1938 | Goodall | 285/259 X |
| 2,374,225 | 4/1945 | Melsom | 285/259 X |
| 3,263,699 | 8/1966 | Givler et al. | 123/119 X |
| 3,359,960 | 12/1967 | Pittsley | 123/119 |

Primary Examiner—Dave W. Arola
Attorney—Stevens, Davis, Miller and Mosher

ABSTRACT: An improved means and method for fastening a crankcase ventilating valve in an internal combustion engine comprising an outlet body of heat stabilized plastic receiving therein the metal valve housing of a crankcase vent valve with said housing having both a straight knurled portion and a locking ridge to provide adequate locking of the valve housing in the outlet body.

GASES FROM CRANKCASE

INVENTOR
WILLIAM E. EHLERT

BY Stevens, Davis, Miller & Mosher
ATTORNEYS

FASTENING MEANS FOR CRANKCASE VENT VALVE

During the development of the two-piece plastic and metal crankcase ventilation valve, it was discovered that the difference in the coefficient of thermal expansion between the metal valve housing and plastic outlet body made it difficult to lock these parts together at the elevated temperatures that the valve was exposed to in the engine compartment during normal running of the engine. The initial samples were fluid tightly fastened together at room temperature, but at hot engine idling temperatures the plastic housing could be easily rotated about the steel valve casing. This clearly indicated that the valve was not fluid tight in the housing and that therefore the valve would not accomplish its purpose of smog control by recirculating blowby accumulating in the engine crankcase.

The general type of valve used in combination with the present invention has been described in U.S. Pat. No. 3,263,699 to John D. Givler et al. issued Aug. 2, 1966, and generally comprises a metal valve housing having a valve seat and a spring-biased valve therein. The inlet end of the valve housing is mounted on the engine, for example on the rocker arm cover, and the outlet end is connected to the mainfold through an outlet body and conduit.

The present invention provides an improved means for fastening together the valve housing and outlet body of crankcase vent valves by having an outwardly directed locking ridge and an adjacent straight knurled portion on the valve housing for engaging with and tightly holding the valve housing fast in the outlet body under all temperature conditions.

It is an object of the present invention to provide a means and method for securely fastening the outlet end of a crankcase vent valve to an outlet body which will overcome the above-noted deficiencies of the prior art.

It is a further object of the present invention to produce a fastening means which is readily and economically produced.

It is also an object of the present invention to produce a fastening means which allows rapid assembly of the valve housing and outlet body.

The means for accomplishing the foregoing objects and other advantages, which will be apparent to those skilled in the art, are set forth in the following specification and claims, and are illustrated in the accompanying drawings dealing with a basic embodiment of the present invention. Reference is made now to the drawings in which:

Figure 1:
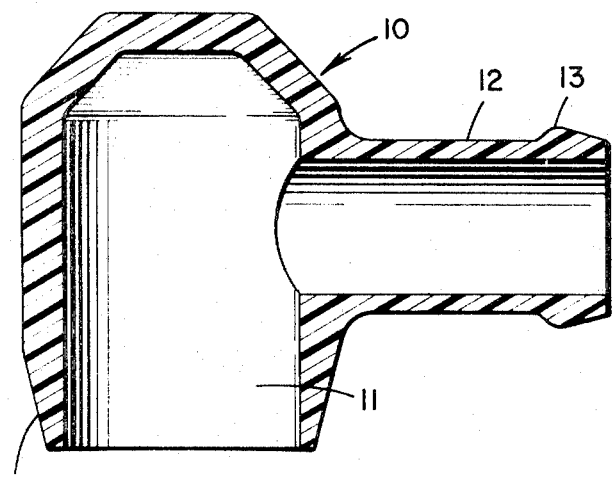
FIG. 1 is a vertical section through the outlet body.
Figure 2:
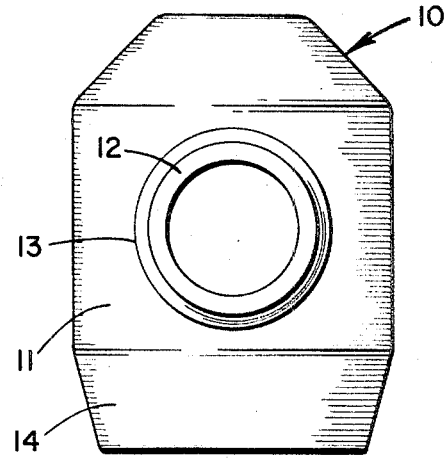
FIG. 2 is an end view of the outlet body.

The plastic outlet body 10 is comprised of substantially two main portions. Portion 11 is a cylindrical portion which receives the valve housing itself. Portion 12 is an integral tubular portion intersecting the larger cylindrical portion 11 at substantially a right angle and serves to connect the valve to a conduit leading to the intake manifold. The tubular portion 12 has an outwardly directed flange 13 at its outer end thereof. The cylindrical portion 11 has an inwardly directed taper 14 at the bottom end thereof. The taper 14 makes the lower part of cylinder 11 more resilient so that it can be pushed over protrusions of valve housing more easily.

Figure 3:
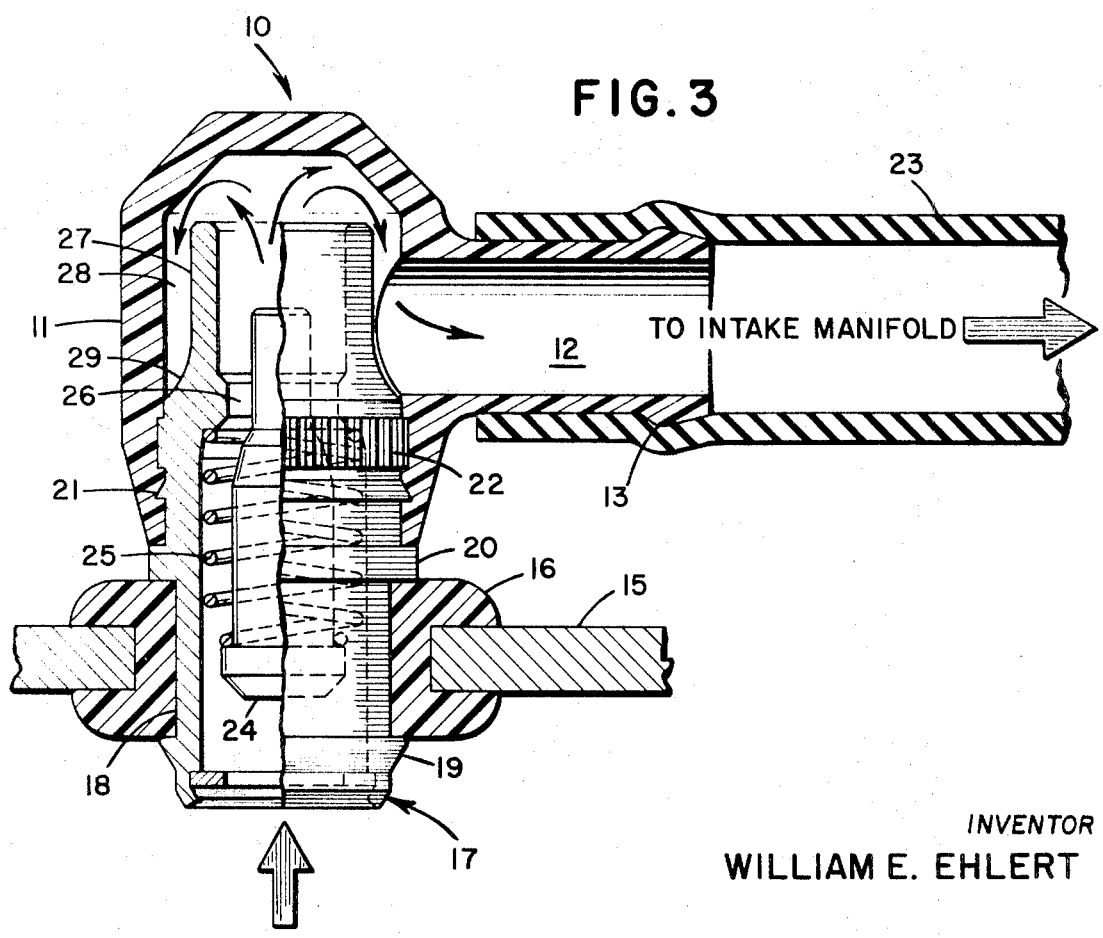
FIG. 3 is a vertical section of the assembled outlet body and valve with the valve being shown only partly in section.

Turning to FIG. 3, the assembly of the invention is shown with the engine crankcase being generally indicated at 15. The crankcase has an orifice therein into which a resilient grommet 16 is fixed. The valve body 17 includes a groove portion 18 which is received in the grommet 16 between annular flanges 19 and 20. The outlet body 10 is fitted on the valve housing through a combination of the locking ridge 21 and a straight knurled portion 22, for example 96 pitch straight knurl, which is adjacent to but spaced from the locking ridge. Both the locking ridge and the straight knurled portion engage with, and to some extent penetrate into, the sidewalls of the cylindrical portion 11 of the outlet body to tightly hold the valve housing therein. A flexible tube or conduit 23 is connected to the tubular portion 12, and annular flange 13 serves to hold the tube in position.

The valve itself has been generally indicated as having a valve body 24, a spring biasing means 25, and a valve seat 26. The operation of the valve is known and operates according to the principles as described in the above-mentioned patent 3,263,699 to Givler et al.

It should be noted that the upper end of the valve housing has a portion 27 which has a reduced diameter so that an annular chamber 28 is formed between the outlet body and the valve housing. The lower edge of the reduced diameter portion 27 is preferably in substantial alignment with the tubular portion 12 so that there will be free passage of gases through the valve, annular chamber and tubular portion. The reduced diameter portion 27 is connected to the main portion of the valve housing by an inclined surface 29, which surface may be either linear or arcuate (as shown).

The outer diameter of the main portion of the valve housing is slightly larger than the interior diameter of the cylindrical portion 11 of the outlet body. This, of course, assures a tight fit when the parts are assembled. The inclined portion 29 aids the assembly of parts by camming the cylindrical portion 11 open as the valve housing is forced in.

The material used for the outlet body is preferably a heat stabile material such as Zytel–103, a product of E. I. Dupont De Nemours Co., Wilmington, Delaware. Zytel is heat stabilized 66 nylon containing a stabilizer to retard embrittlement at high service temperatures. It has good thermal stability but poor electrical properties.

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are to be therefore embraced therein.

I claim:

1. A means for forming a fluid tight connection between the valve housing and outlet body of crankcase vent valves at elevated temperatures, which connection is solely formed by said valve housing and outlet body, comprising an outlet body having a cylindrical portion with a tubular portion extending at right angles therefrom said cylindrical portion having a bore therein and a valve housing having a radially outwardly directed locking ridge and a straight knurled portion adjacent to but spaced from said locking ridge, said straight knurled portion and locking ridge having an outer diameter greater than the inner diameter of said cylindrical bore portion, said knurled portion and locking ridge engaging with and tightly holding said valve housing fast in said cylindrical bore portion of said outlet body, said outlet body providing a substantially smooth outer surface when assembled with substantially no deformation of its outer surface at least in the area of said ridge and knurled portion.

2. The device according to claim 1 wherein said outlet body is formed of a heat stabilized 66 nylon having high thermal stability.

3. The device according to claim 1 wherein the valve housing has a bore therethrough and a portion of reduced diameter connected to the remaining portion by an inclined surface, an annular chamber formed by said cylindrical portion of said outlet body and the reduced diameter portion of said valve housing, said annular chamber, valve housing bore and tubular portion being in fluid communication with each other.

4. The device according to claim 3 wherein said outlet body has an interior diameter less than the outer diameter of the remaining portion of said valve housing, said inclined surface serving to cam said outlet body open during assembly.

5. A method for forming a fluid tight connection between the valve housing and outlet body of a two-piece crankcase vent valve at elevated temperatures which relies solely on said housing and outlet body to form said connection, comprising forming a bore in said outlet body, forming on said vent valve housing a locking ridge having an outer diameter larger than the diameter of said bore forming a straight knurled portion having an outer diameter larger than the diameter of said bore adjacent to but spaced from said locking ridge and forming adjacent said knurled portion an end portion of said housing of reduced diameter connected to the rest of the housing by an inclined surface and mounting said housing in said outlet body bore, said inclined surface serving to cam open said outlet body to receive said valve housing with said bore, said outlet body being plastically deformed on the interior of said bore only by said locking ridge and knurled portion and presenting a substantially smooth outer surface with substantially no deformation of its outer surface at least in the area of said ridge and knurled portion.